(12) United States Patent
Perley et al.

(10) Patent No.: US 12,153,487 B1
(45) Date of Patent: Nov. 26, 2024

(54) CUSTOMIZABLE SOC STATE REPORTING

(71) Applicant: Advanced Micro Devices, Inc., Santa Clara, CA (US)

(72) Inventors: Tim Perley, Fort Collins, CO (US); Alexander Nozik, Santa Clara, CA (US); Siddharth K. Shah, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 89 days.

(21) Appl. No.: 18/083,218

(22) Filed: Dec. 16, 2022

(51) Int. Cl.
*G06F 11/00* (2006.01)
*G06F 11/07* (2006.01)

(52) U.S. Cl.
CPC ...... *G06F 11/0772* (2013.01); *G06F 11/0793* (2013.01)

(58) Field of Classification Search
CPC .................. G06F 11/0772; G06F 11/0793
See application file for complete search history.

(56) References Cited

U.S. PATENT DOCUMENTS

| | | | | |
|---|---|---|---|---|
| 6,654,909 B1 * | 11/2003 | Quach | ................ | G06F 11/1064 714/48 |
| 11,360,839 B1 * | 6/2022 | Hsiao | ................ | G06F 13/4282 |
| 2004/0078650 A1 * | 4/2004 | Safford | ............... | G06F 11/2242 714/11 |
| 2005/0138347 A1 * | 6/2005 | Haverkamp | ............. | G06F 8/65 713/2 |
| 2007/0169084 A1 * | 7/2007 | Frank | .................. | G06F 9/44505 717/168 |
| 2013/0339829 A1 * | 12/2013 | Vargas | ............... | G06F 11/1004 714/807 |
| 2014/0189445 A1 * | 7/2014 | Raj | ...................... | G06F 11/0793 714/57 |
| 2014/0223226 A1 * | 8/2014 | Yigzaw | ............... | G06F 11/1405 714/15 |
| 2015/0100848 A1 * | 4/2015 | Kalamatianos | ........ | G11C 29/52 714/764 |
| 2018/0217889 A1 * | 8/2018 | Bhutta | ................ | G06F 11/0751 |
| 2021/0255939 A1 * | 8/2021 | Chaiken | ............. | G06F 11/0757 |
| 2022/0066861 A1 * | 3/2022 | Tan | ..................... | G06F 11/0751 |
| 2022/0138049 A1 * | 5/2022 | Lee | ........................ | G06F 11/073 714/15 |
| 2022/0171672 A1 * | 6/2022 | Mitra | .................. | G06F 11/0772 |
| 2023/0315575 A1 * | 10/2023 | Jayakumar | ............ | G06F 21/572 714/2 |
| 2024/0004757 A1 * | 1/2024 | Lee | ........................ | G06F 11/076 |

* cited by examiner

*Primary Examiner* — Joshua P Lottich

(74) *Attorney, Agent, or Firm* — Greenberg Traurig, LLP

(57) ABSTRACT

The disclosed computer-implemented method includes receiving, by a first circuit subsystem, a hardware error signal and storing, in response to the hardware error signal, a signal state of the first circuit subsystem in a reset-persistent register. The method also includes sending, by the first circuit subsystem, the hardware error signal to a second circuit subsystem. Various other methods, systems, and computer-readable media are also disclosed.

20 Claims, 4 Drawing Sheets

CUSTOMIZABLE SOC STATE REPORTING

BACKGROUND

A processor of a computing device may have mechanisms for reporting some state information in response to a hardware error. For example, the Machine Check Architecture (MCA) defines an architecture for a processor or a system on a chip (SoC) for reporting hardware errors by storing error data in architecturally defined registers such as model-specific registers (MSRs) that can be read by BIOS or software after a reboot. The processor may experience a hardware error and report a type of hardware error in the MSR or other registers defined for MCA.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
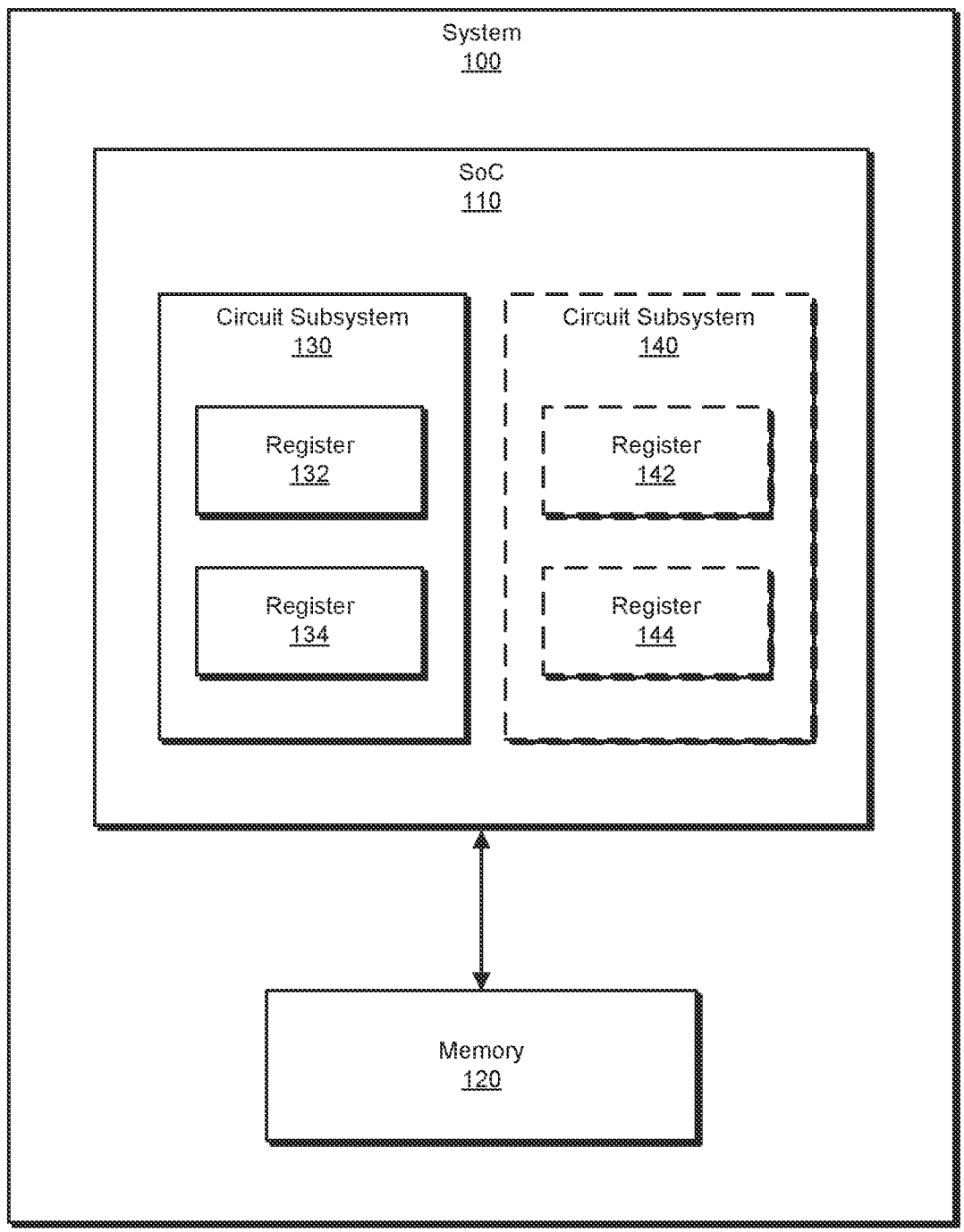
FIG. 1 is a block diagram of an exemplary system for customizable SoC state reporting.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

As will be described in greater detail below, the instant disclosure describes various systems and methods for customizable SoC state reporting. A circuit subsystem of an SoC and/or processor can, in response to a hardware error signal, pause its activity and store its signal state in a reset-persistent register. The circuit subsystem can then shut down and send the hardware error signal to another circuit subsystem of the SoC/processor.

In one example, a method for customizable SoC state reporting includes receiving, by a first circuit subsystem, a hardware error signal and storing, in response to the hardware error signal, a signal state of the first circuit subsystem in a reset-persistent register. The method also includes sending, by the first circuit subsystem, the hardware error signal to a second circuit subsystem.

In some examples, storing the signal state of the first circuit subsystem also includes selecting a subset of the signal state of the first circuit subsystem and storing, in the reset-persistent register, the selected subset of the signal state. In some examples, selecting the subset of the signal state also includes multiplexing signals of the signal state of the first circuit subsystem into the reset-persistent register. In some examples, selecting the subset of the signal state of the first circuit subsystem is based on a configuration stored in a configuration register corresponding to the first circuit subsystem.

In some examples, the method also includes shutting down the first circuit subsystem. The reset-persistent register maintains the stored signal state after the first circuit subsystem shuts down.

In some examples, receiving the hardware error signal also includes receiving, by the first circuit subsystem from a third circuit subsystem, the hardware error signal in response to a hardware error detected by the third circuit subsystem. In some examples, receiving the hardware error signal also includes detecting, by the first circuit subsystem, a hardware error.

In one implementation, a system for customizable SoC state reporting includes a first circuit subsystem, a first reset-persistent register, a second circuit subsystem, and a second reset-persistent register. The first circuit subsystem is configured to receive a hardware error signal, select, in response to the hardware error signal, a subset of a first signal state of the first circuit subsystem. The first circuit subsystem is also configured to store, in the first reset-persistent register, the selected subset of the first signal state and send the hardware error signal to the second circuit subsystem.

In some examples, the first circuit subsystem is also configured to shut down the first circuit subsystem. The first reset-persistent register maintains the stored subset of the first signal state after the first circuit subsystem shuts down. In some examples, the system also includes a multiplexer coupled to the first reset-persistent register and configured to multiplex signals of the first signal state for storing the subset of the first signal state. In some examples, the system also includes a configuration register for storing a configuration for selecting the subset of the first signal state in the first reset-persistent register.

In some examples, the first circuit subsystem receives the hardware error signal in response to a hardware error detected in a third circuit subsystem of the system. In some examples, the first circuit subsystem receives the hardware error signal in response to a hardware error detected in the first circuit subsystem.

In some examples, the second circuit subsystem is configured to receive the hardware error signal from the first circuit subsystem and store, in response to the hardware error signal, a second signal state of the second circuit subsystem in the second reset-persistent register. The second circuit subsystem is also configured to shut down the second circuit subsystem and send the hardware error signal to a third circuit subsystem. The second reset-persistent register maintains the stored subset of the second signal state after the second circuit subsystem shuts down.

In one implementation, a circuit for customizable processor debug reporting includes a first circuit subsystem including a first reset-persistent register and a first configuration register. The circuit also includes a second circuit subsystem including a second reset-persistent register and a second configuration register. The first circuit subsystem is configured to receive a hardware error signal and store, in response to the hardware error signal, a subset of a first signal state of the first circuit subsystem in the first reset-persistent register based on a first configuration in the first configuration register. The first circuit subsystem is also configured to send the hardware error signal to the second circuit subsystem.

In some examples, the first circuit subsystem is also configured to shut down the first circuit subsystem. The first reset-persistent register maintains the stored subset of the first signal state after the first circuit subsystem shuts down. In some examples, the first circuit subsystem also includes a multiplexer coupled to the first reset-persistent register and configured to multiplex signals of the first signal state for storing the subset of the first signal state in the first reset-persistent register.

In some examples, the first circuit subsystem receives the hardware error signal in response to a hardware error detected in a third circuit subsystem of the circuit. In some examples, the first circuit subsystem receives the hardware error signal in response to a hardware error detected in the first circuit subsystem.

In some examples, the second circuit subsystem is configured to receive the hardware error signal from the first circuit subsystem, and store, in response to the hardware error signal, a subset of a second signal state of the second circuit subsystem in the second reset-persistent register based on a second configuration in the second configuration register. The second circuit subsystem is also configured to shut down the second circuit subsystem and send the hardware error signal to a third circuit subsystem. The second reset-persistent register maintains the stored subset of the second signal state after the second circuit subsystem shuts down.

Features from any of the above-mentioned implementations can be used in combination with one another in accordance with the general principles described herein. These and other implementations, features, and advantages will be more fully understood upon reading the following detailed description in conjunction with the accompanying drawings and claims.

The present disclosure is generally directed to customizable microarchitecture state reporting for processors or SoCs. As will be explained in greater detail below, implementations of the present disclosure store signal states of circuit subsystems in response to a hardware error signal to provide data for debugging the hardware error and/or profiling hardware behavior. A subset of the signal state can be custom selected for storing in a register reserved for storing debug data. Multiple subsystems of the processor can store debug data in response to the hardware error signal.

Figure 2A:
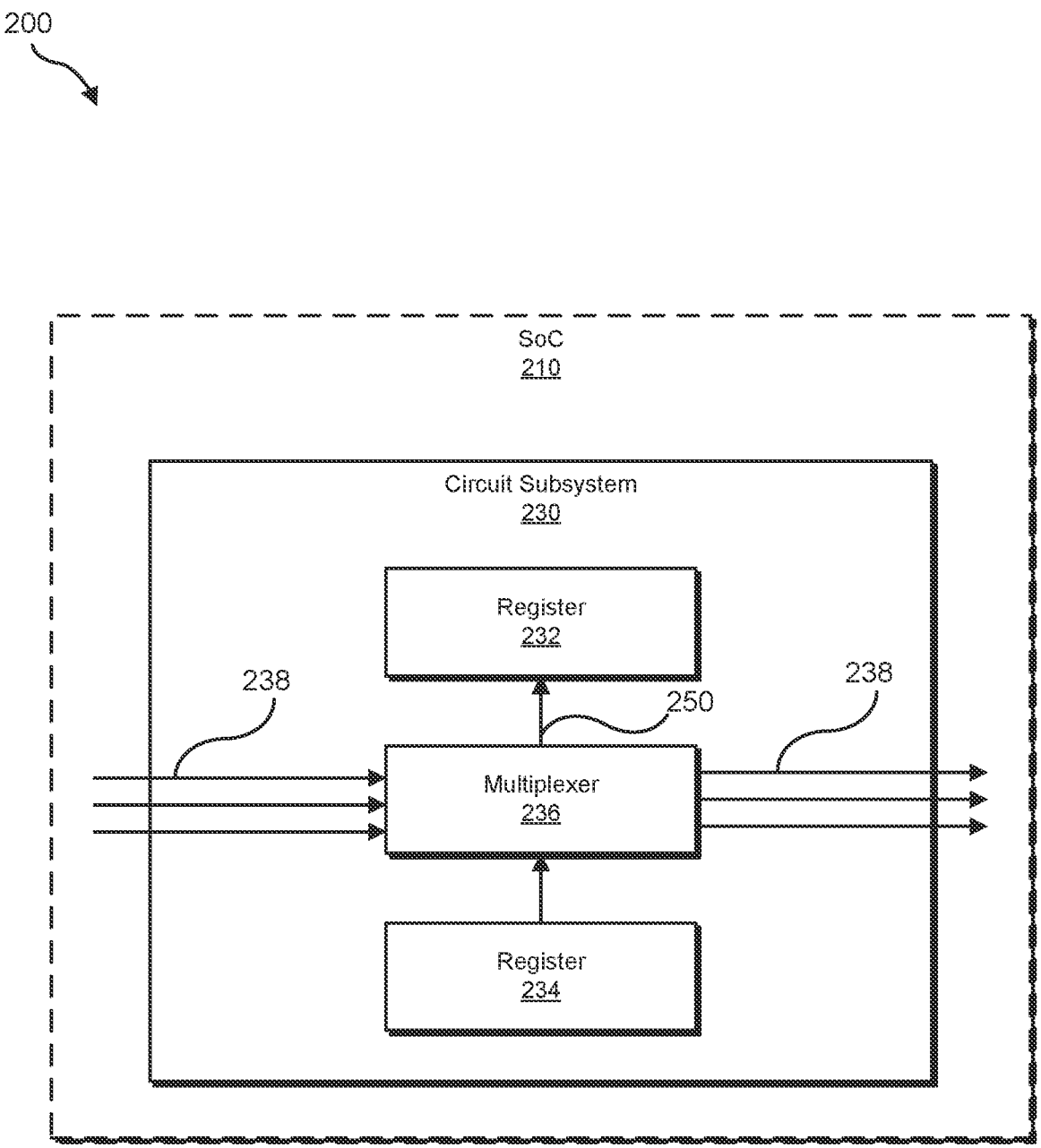
FIG. 2A-2B are block diagrams of exemplary circuit subsystems for customizable SoC state reporting.
Figure 2B:
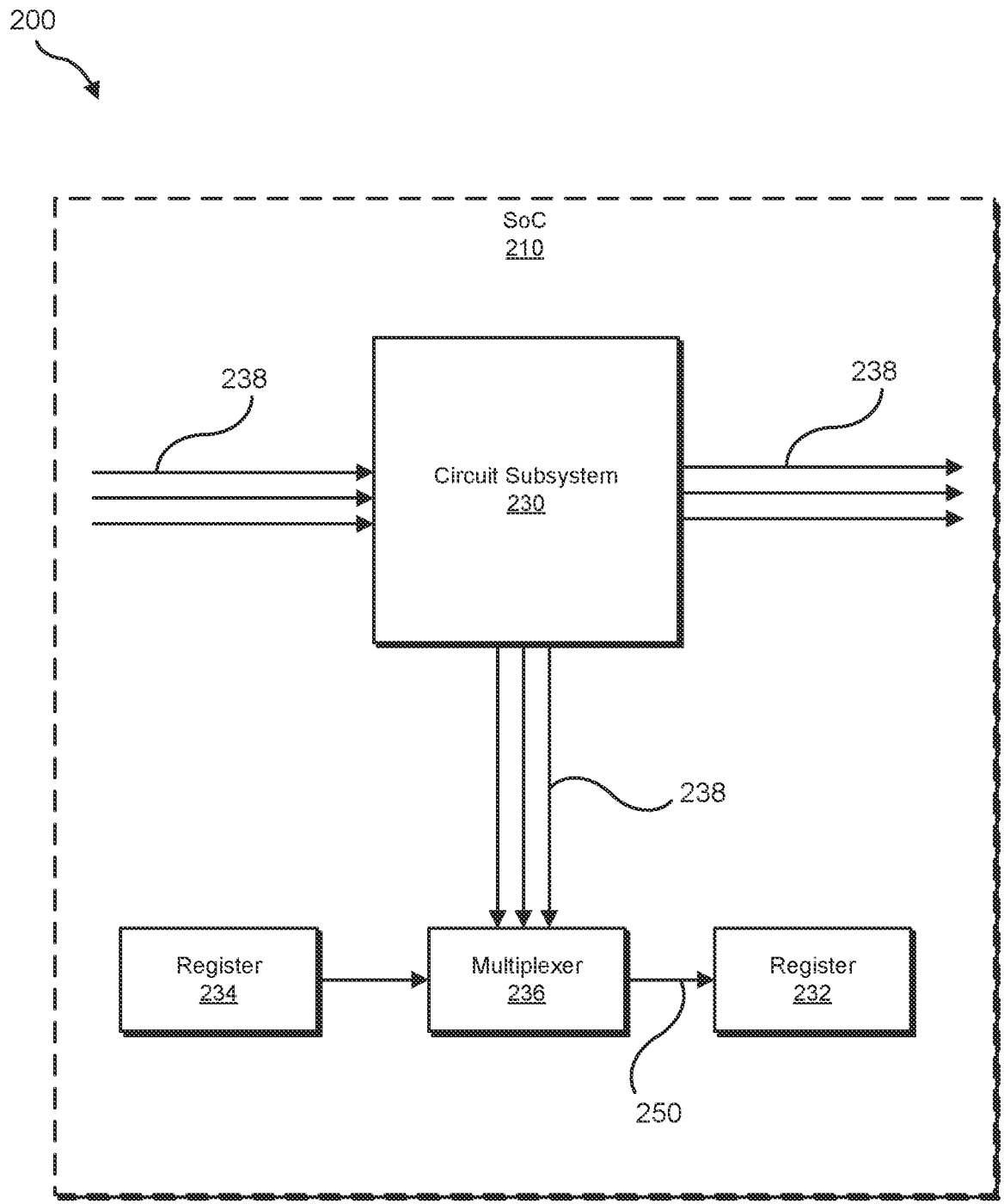
Figure 3:
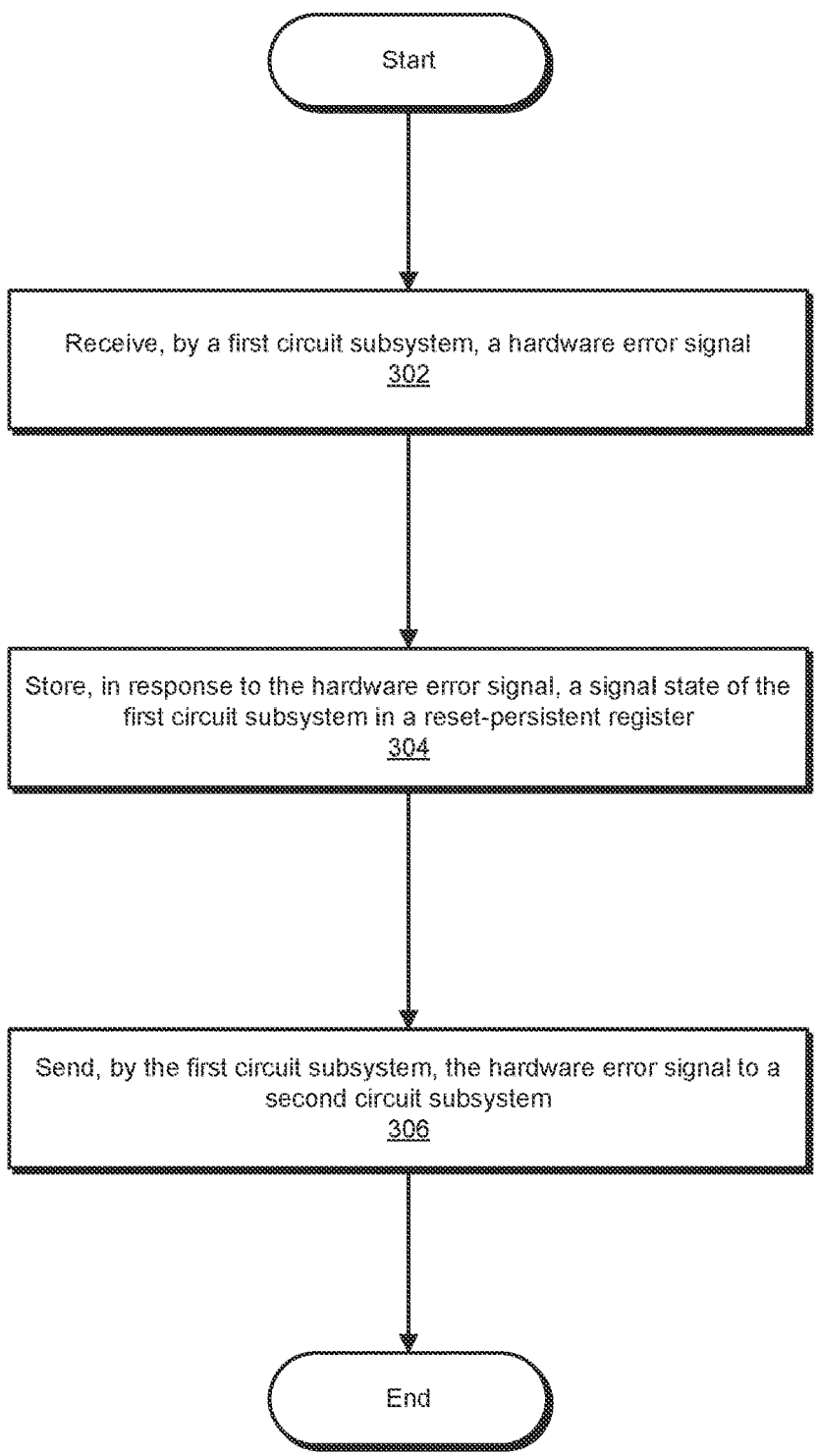
FIG. 3 is a flow diagram of an exemplary method for customizable SoC state reporting.

The following will provide, with reference to FIGS. 1-3, detailed descriptions of systems and methods for customizable processor debug reporting. Detailed descriptions of example systems for customizable processor debug reporting will be provided in connection with FIGS. 1 and 2A-2B. Detailed descriptions of corresponding computer-implemented methods will also be provided in connection with FIG. 3.

FIG. 1 is a block diagram of an example system 100 for customizable microarchitectural state reporting for SoCs and/or processors. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as SoC 110. SoC 110 generally represents any type or form of hardware-implemented processing unit and/or SoC capable of interpreting and/or executing computer-readable instructions. In some examples, SoC 110 accesses and/or modifies data and/or instructions stored in memory 120. Examples of SoC 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, SoC 110 includes a circuit subsystem 130 and optionally, in some examples, a circuit subsystem 140. Circuit subsystem 130 and circuit subsystem 140 correspond to subunits of SoC 110. Examples of circuit subsystem 130 and circuit subsystem 140 include, without limitation, processor cores, microprocessors, control units, logic units, execution units, memory devices, interfaces, signal processing units, etc. Circuit subsystem 130 includes a register 132 and a register 134. Similarly, circuit subsystem 140 includes a register 142 and a register 144. Register 132 and register 142 are reserved for storing state data (e.g., data generated as a result of encountering a hardware error that can be used for debugging and or profiling behavior) and in some examples are reset-persistent registers that maintain data after a reboot or reset of system 100. Register 134 and register 144 are reserved for storing configurations for customizing state data to be stored in register 132 and register 142, respectively, as will be further described below. Although FIG. 1 illustrates circuit subsystem 130 having register 132 and register 134, and circuit subsystem 140 having register 142 and register 144, in other examples the registers may be located elsewhere on SoC 110 and accordingly reserved for subsystems.

In some examples, when system 100 and more specifically SoC 110 experiences a hardware error, a hardware error signal is propagated through the subsystems of SoC 110, including circuit subsystem 130 and circuit subsystem 140. Examples of hardware errors include, without limitation, system bus errors, ECC errors, parity errors, cache errors, translation lookaside buffer errors, storage errors in caches, transaction errors, or other fatal errors (e.g., conditions that should not occur during normal operation). In some examples, the hardware error signal is a machine-check exception or other intercept signal having a high priority.

In response to the hardware error signal, circuit subsystem 130 and circuit subsystem 140 each store their signal states in register 132 and register 142, respectively, pause their operations, and shut down. For example, after receiving the hardware error signal, circuit subsystem 130. Circuit subsystem 130 stores its signal state or logic level values of the signals circuit subsystem 130 was processing before stopping its operations. In some examples, circuit subsystem 130 stores a predetermined subset of its signal state based on the configuration stored in register 134. After storing its signal state as debug data, circuit subsystem 130 pauses or stops its operations or otherwise shuts down. To propagate the hardware error signal, circuit subsystem 130 sends the hardware error signal to another subsystem, such as circuit subsystem 140 if present. In some examples, the hardware error signal is propagated to circuit subsystems relevant to the hardware error generating the hardware error signal. In some examples, the configurations indicate not to store any signal state data based on a type of the hardware error signal.

FIGS. 2A and 2B illustrate a system 200 that corresponds to system 100 and having an SoC 210 that corresponds to SoC 110. System 200 includes a simplified diagram of a circuit subsystem 230 that corresponds to circuit subsystem 130 and circuit subsystem 140. Circuit subsystem 230 includes a register 232 that corresponds to register 132 (and register 142) and a register 234 that corresponds to register 134 (and register 144). Register 232 is a warm reset-persistent register that maintains stored data after circuit subsystem 230 shuts down. Register 234 is a configuration register that stores a configuration for customizing what state data is stored in register 232.

Circuit subsystem 230 receives one or more signals 238 as input for processing, and outputs the one or more signals 238. Circuit subsystem 230 includes a multiplexer (or mux) 236 that multiplexes the signals 238 for storing as a signal state 250 in register 232 based on the configuration stored in register 234.

When system 200 and/or a processor/SoC thereof (e.g., SoC 210 including circuit subsystem 230) experiences a hardware error, circuit subsystem 230 receives a hardware error signal. In some examples, circuit subsystem 230 itself exhibits the hardware error and generates the hardware error signal. In other examples, circuit subsystem 230 receives the hardware error signal from another subsystem, such as another subsystem propagating the hardware error signal or a subsystem that triggered the hardware error signal. In yet other examples, circuit subsystem 230 receives the hardware error signal from outside of SoC 210, e.g., another component of system 200, which circuit subsystem 230 can be configured to ignore, mask, or respond to.

In response to receiving the hardware error signal, circuit subsystem 230 logs state data. For example, circuit subsystem 230 stores, as signal state 250, signals 238 that circuit subsystem 230 was processing when circuit subsystem 230 received the hardware error signal. Signal state 250 corresponds to logic-level values (e.g., high or low, 1 or 0, etc.) of a current state of circuit subsystem 230 when the hardware error occurred. Signal state 250 is not abstracted into data values but rather kept as logic-level values in order to mitigate potential security concerns in reading data from secure device components. As such, signal state 250 in some examples corresponds to a microarchitectural state.

In some examples, circuit subsystem 230 stores a subset of signal 238 as signal state 250. For example, register 234 includes a configuration for selecting, via multiplexer 236, which of signals 238 to store as signal state 250. The configuration can be predetermined and customized via software. In some examples, the configuration defines different subsets of signals 238 to store based on a type of hardware error signal. In some examples, rather than a static configuration, multiplexer 236 is dynamically configured by a logic to intelligently select the subset of signals 238 for storing in register 232. The debug data stored in register 232 (e.g., signal state 250) can be subsequently read by software, such as BIOS or debug software, after rebooting system 200.

Although FIG. 2A illustrates circuit subsystem 230 as including register 232, register 234, and multiplexer 236, in other examples register 232, multiplexer 236, and register 234 can be located elsewhere in system 200, as illustrated in FIG. 2B. In FIG. 2B, signals 238 are routed to multiplexer 236 that is located external to circuit subsystem 230.

FIG. 3 is a flow diagram of an exemplary computer-implemented method 300 for customizable SoC state reporting. The steps shown in FIG. 3 may be performed by any suitable computer-executable code and/or computing system, including the system(s) illustrated in FIGS. 1 and/or 2A-2B. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein receives, by a first circuit subsystem, a hardware error signal. For example, circuit subsystem 130 receives a hardware error signal.

In some implementations, the term "hardware error signal" can refer to an exception, interrupt, or other signal that breaks a normal flow of execution of a processor that is broadcast in response to a hardware error. Examples of hardware errors include, without limitation, system bus errors, ECC errors, parity errors, cache errors, translation lookaside buffer errors, FSB transaction errors, storage errors in processor-internal caches, etc. In other examples, a hardware error signal does not refer to or is in response to an actual hardware error and instead corresponds to a debug signal for inducing actions for debugging purposes and/or hardware behavior profiling.

The systems described herein can perform step 302 in a variety of ways. In one example, circuit subsystem 130 detects a hardware error or otherwise generates the hardware error signal. In some examples, circuit subsystem 130 receives the hardware error signal from another subsystem, such as circuit subsystem 140. In some examples, circuit subsystem 140 detected the hardware error or generated the hardware error signal. In other examples, circuit subsystem 140 broadcast the hardware error signal received from another subsystem.

In yet other examples, circuit subsystem 130 receives the hardware error signal from an outside source, such as outside of SoC 110. In such examples, circuit subsystem 130 can be configured to respond to signals from outside sources or can be configured to not respond to signals from outside sources. In some examples, the hardware error signal can be masked, such as circuit subsystem 130 masking the signal from outside sources.

At step 304 one or more of the systems described herein store, in response to the hardware error signal, a signal state of the first circuit subsystem in a reset-persistent register. For example, circuit subsystem 130 stores its signal state in register 132.

In some implementations, the term "signal state" can refer to a current state of values of the signals being processed by a subsystem. A signal state includes signal values or logic values which have not been abstracted into data (e.g., data that can be interpreted in the context of a program). The signal state corresponds to a hardware-level state (e.g., microarchitectural state) of the subsystem that can be useful for debugging hardware errors and/or profiling hardware behavior.

In some implementations, the term "reset-persistent register" can refer to a register that can maintain its stored values after a reset or reboot. In some examples, a reset-persistent register maintains its stored values after a warm reset in which the system resets without shutting off or power cycling.

The systems described herein can perform step 304 in a variety of ways. In one example, storing the signal state includes selecting a subset of the signal state of circuit subsystem 130 and storing, in register 132 (e.g., the reset-persistent register), the selected subset of the signal state. In some examples, the subset is selected based on a configuration stored in register 134 (e.g., a configuration register corresponding to the circuit subsystem). For example, the configuration may be preconfigured to specify which signals to store. In some examples, the configuration specifies different subsets for different error types or specifies specific states for certain errors.

In some examples, selecting the subset of the signal state includes multiplexing signals of the signal state into the reset-persistent register. For example, as illustrated in FIGS. 2A-2B, multiplexer 236 multiplexes signals 238 into register 232. In some examples, rather than having a static configuration, multiplexer 236 is dynamically instructed to intelligently multiplex signals 238 based on various factors, such as error type, error frequency, time since the last error, type of subsystem, etc.

In some examples, after storing the signal state, the circuit subsystem shuts down or otherwise takes itself down. For example, circuit subsystem 130 pauses or stops its execution. Register 132 maintains the stored signal state after circuit subsystem 130 shuts down.

In some examples, the hardware error signal is a non-fatal error such that circuit subsystem 130 does not shut down. For example, the hardware error signal is used for periodic profiling of subsystems (e.g., by storing signal states periodically) or otherwise event driven for evaluation and analysis.

Returning to FIG. 3, at step 306 one or more of the systems described herein sends, by the first circuit subsystem, the hardware error signal to a second circuit subsystem. For example, circuit subsystem 130 sends the hardware error signal to circuit subsystem 140 to continue broadcasting the hardware error signal to the subsystems of SoC 110.

In some examples, the second circuit subsystem (e.g., circuit subsystem 140) performs one or more steps of method 300. For example, after receiving the hardware error signal, circuit subsystem 140 can store, in register 142, its signal state based on a configuration in register 144, and send the hardware error signal to another subsystem of SoC 110. Thus, the subsystems of SoC 110 can accordingly log their respective signal states as the hardware error signal is broadcast. For debugging the hardware error, the various subsystems of SoC 110 accordingly store their respective signal states.

Rapid debugging is driven by gathering useful information near issue manifestation. Certain environments, such as production environments have the SoC in a secure state. As described herein, the present disclosure provides systems and methods for gathering more in-depth information, including details of micro-architectural states within the MCA architecture, than the high-level system failure information available from the Advanced Configuration and Power Interface (ACPI) specification via the Boot Error Record Table (BERT). This in-depth information is delivered without having to secure unlock hardware components or without using a JTAG-based flop scan.

The additional data provides a richer set of processor state data at issue intercept. The data can include a memory state and/or other signals of the subsystem. The data collected can be adjusted or customized based on multiplexer selects. The multiplexer selects can be changed via secure patches, for example for similarly reproducing issues.

As detailed above, the computing devices and systems described and/or illustrated herein broadly represent any type or form of computing device or system capable of executing computer-readable instructions, such as those contained within the circuits described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising".

What is claimed is:

1. A method comprising:
   receiving, by a first circuit subsystem, a hardware error signal; and
   storing in a reset-persistent register, in response to the hardware error signal, a subset of a signal state of the first circuit subsystem, wherein the subset is selected based on a configuration.

2. The method of claim 1, wherein storing the subset of the signal state further comprises multiplexing signals of the signal state of the first circuit subsystem into the reset-persistent register.

3. The method of claim 1, wherein the configuration is stored in a configuration register corresponding to the first circuit subsystem.

4. The method of claim 1, further comprising shutting down the first circuit subsystem, wherein the reset-persistent register maintains the stored subset of the signal state after the first circuit subsystem shuts down.

5. The method of claim 1, wherein receiving the hardware error signal further comprises receiving, by the first circuit subsystem from a third circuit subsystem, the hardware error signal in response to a hardware error detected by the third circuit subsystem.

6. The method of claim 1, wherein receiving the hardware error signal further comprises detecting, by the first circuit subsystem, a hardware error.

7. The method of claim 1, further comprising sending, by the first circuit subsystem, the hardware error signal to a second circuit subsystem.

8. A system comprising:
   a first circuit subsystem;
   a first reset-persistent register;
   a second circuit subsystem; and
   a second reset-persistent register;
   wherein the first circuit subsystem is configured to:
      receive a hardware error signal;
      select, in response to the hardware error signal, a subset of a first signal state of the first circuit subsystem, wherein the subset is selected based on a configuration;
      store, in the first reset-persistent register, the selected subset of the first signal state; and
      send the hardware error signal to the second circuit subsystem.

9. The system of claim 8, wherein the first circuit subsystem is further configured to shut down the first circuit subsystem, wherein the first reset-persistent register maintains the stored subset of the first signal state after the first circuit subsystem shuts down.

10. The system of claim 8, further comprising a multiplexer coupled to the first reset-persistent register and configured to multiplex signals of the first signal state for storing the subset of the first signal state.

11. The system of claim 8, further comprising a configuration register for storing the configuration for selecting the subset of the first signal state in the first reset-persistent register.

12. The system of claim 8, wherein the first circuit subsystem receives the hardware error signal in response to a hardware error detected in a third circuit subsystem of the system.

13. The system of claim 8, wherein the first circuit subsystem receives the hardware error signal in response to a hardware error detected in the first circuit subsystem.

14. The system of claim 8, wherein the second circuit subsystem is configured to:
   receive the hardware error signal from the first circuit subsystem;
   store, in response to the hardware error signal, a second signal state of the second circuit subsystem in the second reset-persistent register;
   shut down the second circuit subsystem, wherein the second reset-persistent register maintains the stored subset of the second signal state after the second circuit subsystem shuts down; and
   send the hardware error signal to a third circuit subsystem.

15. A circuit comprising:
   a first circuit subsystem comprising:
      a first reset-persistent register; and
      a first configuration register; and
   a second circuit subsystem comprising:
      a second reset-persistent register; and
      a second configuration register;
   wherein the first circuit subsystem is configured to:
      receive a hardware error signal;
      store, in response to the hardware error signal, a subset of a first signal state of the first circuit subsystem in the first reset-persistent register based on a first configuration in the first configuration register; and
      send the hardware error signal to the second circuit subsystem.

16. The circuit of claim 15, wherein the first circuit subsystem is further configured to shut down the first circuit subsystem, wherein the first reset-persistent register maintains the stored subset of the first signal state after the first circuit subsystem shuts down.

17. The circuit of claim 15, wherein the first circuit subsystem further comprises a multiplexer coupled to the first reset-persistent register and configured to multiplex signals of the first signal state for storing the subset of the first signal state in the first reset-persistent register.

18. The circuit of claim 15, wherein the first circuit subsystem receives the hardware error signal in response to a hardware error detected in a third circuit subsystem of the circuit.

19. The circuit of claim 15, wherein the first circuit subsystem receives the hardware error signal in response to a hardware error detected in the first circuit subsystem.

20. The circuit of claim 15, wherein the second circuit subsystem is configured to:
   receive the hardware error signal from the first circuit subsystem;
   store, in response to the hardware error signal, a subset of a second signal state of the second circuit subsystem in the second reset-persistent register based on a second configuration in the second configuration register;
   shut down the second circuit subsystem, wherein the second reset-persistent register maintains the stored subset of the second signal state after the second circuit subsystem shuts down; and
   send the hardware error signal to a third circuit subsystem.

* * * * *